United States Patent [19]
King

[11] 3,874,805
[45] Apr. 1, 1974

[54] ANCHOR TERMINALS FOR HEADED TIE RODS
[76] Inventor: Kenneth L. King, County of Suffolk, Weston, Mass.
[22] Filed: May 29, 1973
[21] Appl. No.: 364,832

Related U.S. Application Data
[63] Continuation of Ser. No. 208,863, Dec. 16, 1971, abandoned, which is a continuation of Ser. Nos. 4,970, Jan. 22, 1970, abandoned, and Ser. No. 4,971, Jan. 22, 1970, abandoned, and Ser. No. 5,059, Jan. 22, 1970, abandoned.

[52] U.S. Cl............... 403/360, 403/215, 403/165
[51] Int. Cl. ............................................ F16g 11/00
[58] Field of Search ............ 403/215, 60, 165, 360, 403/78

[56] References Cited
UNITED STATES PATENTS

| 772,456 | 10/1904 | Chandler | 403/60 |
|---|---|---|---|
| 1,201,146 | 10/1916 | Cerney | 403/60 |
| 2,004,398 | 6/1935 | Steenson | 403/44 X |
| 2,022,801 | 12/1935 | Conner | 403/302 |
| 2,851,294 | 9/1958 | Mount | 403/78 |
| 3,263,384 | 8/1966 | Middendorf | 403/187 X |

Primary Examiner—Andrew V. Kundrat
Attorney, Agent, or Firm—Norman S. Blodgett; Gerry A. Blodgett

[57] ABSTRACT

A terminal assembly consisting of a rod and a fitting having an elongated shank through which a bore extends; the rod lies in the bore and is provided with an annular concave surface formed on a head, the rod being closely embraced along the entire length of the bore.

3 Claims, 7 Drawing Figures

PATENTED APR 1 1975          3,874,805

3,874,805

ANCHOR TERMINALS FOR HEADED TIE RODS

This is a continuation of application Ser. No. 208,863 filed Dec. 16, 1971, abandoned, which in turn is a continuation of patent applications Ser. No. 4,970, 4,971, and 5,059 filed on Jan. 22, 1970 and now abandoned.

BACKGROUND OF THE INVENTION

Rods and cables are often used under tension in an environment which is exposed to fluctuating lateral forces such as are encountered in a sailboat with the air flowing over the stays. Under the circumstances, considerable difficulty is experienced with breakage of the rod. Such breakage usually takes place adjacent the terminals and, when it occurs, particularly in a sailboat, the rest of the rigging can be substantially damaged because it is then exposed to the forces in the wind on the sails without being braced against the effect of such forces by a stay. This is particularly true in racing sailboats where the weight must be maintained at a minimum and the rod or cable used for stays is desirably selected as of the smallest diameter possible in order to reduce the resistance of the movement of the sailboat through the air. These and other difficulties experienced with the prior art devices have been obviated in a novel manner by the present invention.

It is, therefore, an outstanding object of the invention to provide a terminal assembly for use with a rod wherein a minimum diameter of rod may be used without a danger of the rod breaking at the terminal.

Another object of this invention is the provision of a terminal for rods and cables in which the fatigue life is greatly increased.

A further object of the present invention is the provision of a terminal assembly which permits the use of rods having in the order of 10 percent less wind resistance.

It is another object of the instant invention to provide a terminal assembly making use of a rod having a head wherein the bending stresses at the head (which are the most frequent cause of head failures) are virtually eliminated because of the provision of a means for protecting the head of the tie rod from all loads except tensile loads.

A still further object of the invention is the provision of a terminal assembly designed so that its strength will exceed that of the cable or rod in applications where vibration of the rod or cable is a factor.

With these and other objects in view, as will be apparent to those skilled in the art, the invention resides in the combination of parts set forth in the specification and covered by the claims appended hereto.

SUMMARY OF THE INVENTION

In general, the invention consists of a terminal assembly having a rod and having a fitting with a bore in which the end of the rod resides. The rod fits snugly in the bore and the bore has a length several times greater than its diameter. The rod extends entirely through the bore and is formed with a head the head having an annular concave surface which engages a corresponding annular convex surface formed around the exit of the bore.

More specifically, the terminal assembly is used with the rod, cable or the like functioning as a tension member and subject to vibration-inducing air flow. The fitting is provided with an eye having a transverse bore adapted to receive a fastening pin and has an elongated shank extending away from the eye with the bore extending longitudinally of the shank from its free end to adjacent the bore in the eye, the shank being formed of a malleable metal so that it can be swaged around the cable. The rod is formed of cold-worked stainless steel and the lateral extent of the head is approximately the radius of the rod.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
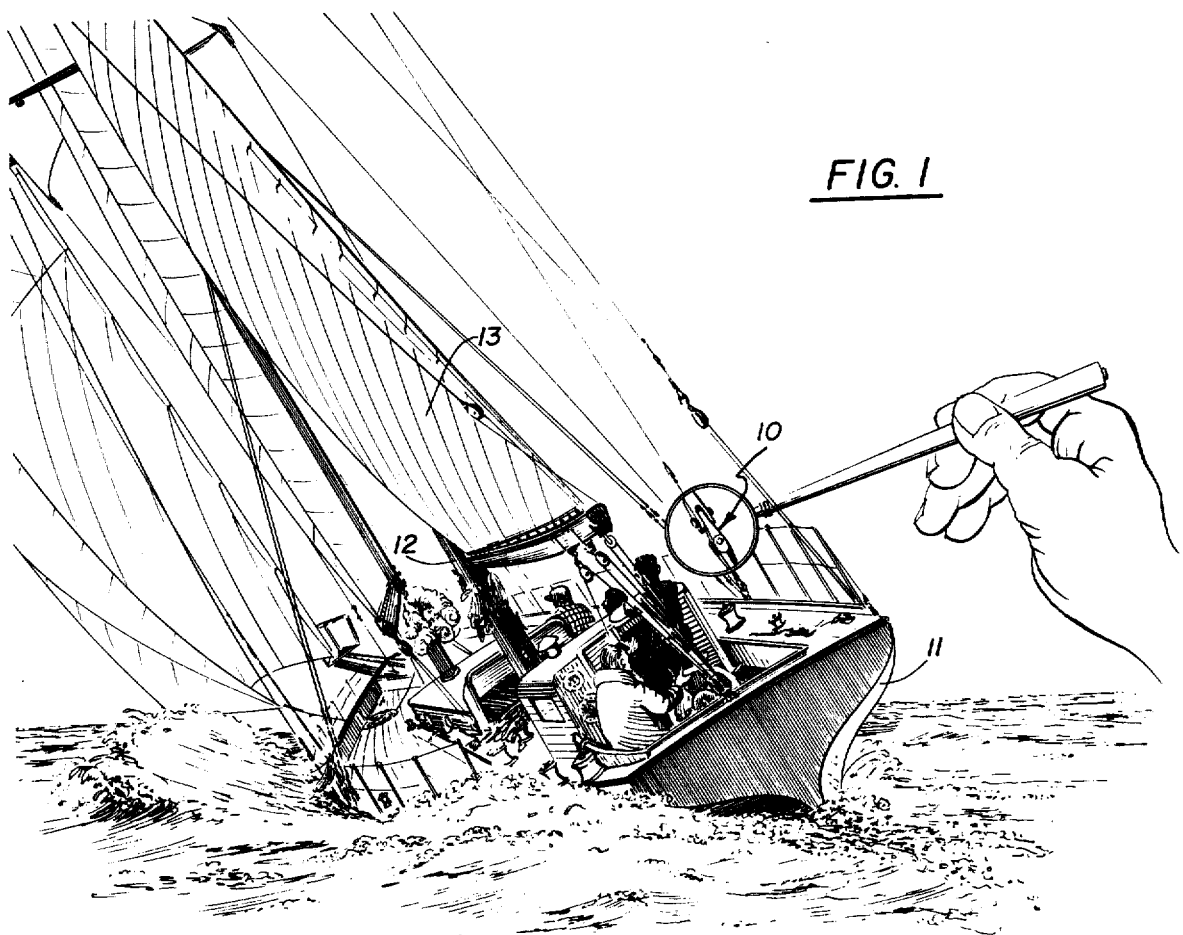
FIG. 1 is a perspective view of a sailboat making use of a terminal assembly embodying the principles of the present invention.

Referring first to FIG. 1, it can be seen that a terminal assembly, indicated generally by the reference numeral 10, is shown in use as a stay on a sailboat 11. As such, it resists the lateral movement of a mast 12 due to the pressure of wind on a sail 13.

Figure 2:
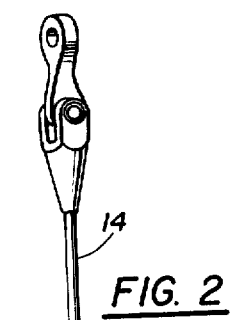
FIG. 2 is a perspective view of a cable provided at each end with terminal assemblies.

Referring to FIG. 2, it can be seen that the terminal assembly 10 is in use with a rod 14 which has a terminal assembly at its other end. The terminal assembly 10 is shown connected to a clevis 15 by means of a pin 16.

Figure 3:
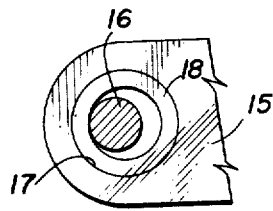
FIG. 3 is a sectional view through a portion of one of the terminal assemblies taken on the line III—III of FIG. 2.

As is evident in FIG. 3, the clevis 15 is provided with a bore 17 in which is mounted a bronze bushing 18. The pin 16 has a substantially smaller diameter than the interior diameter of the bushing 18 and, therefore, presents substantially less friction to movement of the pin relative to the clevis.

Figure 4:
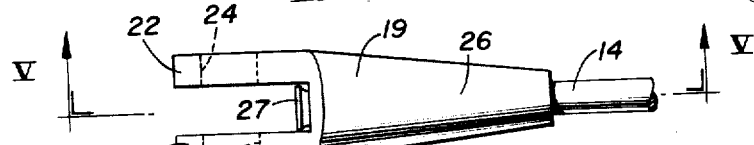
FIG. 4 is a side elevational view of a terminal assembly.
Figure 5:
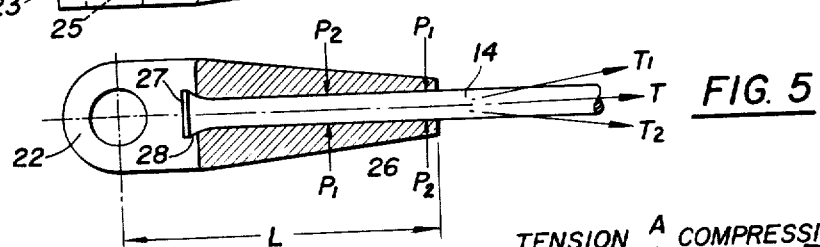
FIG. 5 is a sectional view of the terminal assembly taken on the line V—V of FIG. 4.

In FIGS. 4 and 5, it can be seen that the terminal consists of a rod 14 and a fitting 19. The fitting has a bore 21 in which the rod resides, the rod fitting snugly in the bore. The bore has a length several times greater than its diameter. The fitting shown in the preferred embodiment is a generally U-shaped clevis having two legs 22 and 23 with aligned pin bores 24 and 25, respectively. An elongated shank 26 extends a substantial distance from the interior of the fitting between the legs 22 and 23. Because of the length of the shank 26, the bore 21 is several times greater in length than its diameter. The bore 21 has its axis at right angles to the axis of the pin bores 24 and 25. The end of the rod 14 is provided with a head 27 having an annular concave surface 28 which engages a matching annular convex surface formed at the opening of the bore 21 into the space between the legs 22 and 23.

Figure 6:
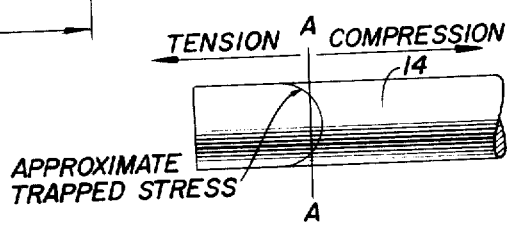
FIG. 6 is a view of the end of a rod before it has been headed.

As is evident in FIG. 6, the rod 14 (which is shown in that figure in the condition that it has before the head 27 is formed) is made of a cold-worked stainless steel. The head 27 is formed on it in such a manner that the head extends laterally from the rod an amount approximately equal to the radius of the rod. The rod is originally formed by cold-working in tension, while the head is formed by compression, that is to say, by grasping the body of the rod to the right of the line A—A and subjecting the portion to the left to a compressive striking. As is evident in FIG. 7, the annular concave surface 28 approximates the surface of an annulus whose cross-section is circular. The fitting 19 and, particularly, the shank 26 is formed of a malleable metal, so that it can be swaged around the cable to the right of the head 27.

It is clear that the present invention has to do with anchor terminals for tensile tie rods designed to brace any type of structure. It is extremely valuable when applied to forestays of sailboats and other tie rods where vibratory as well as tensile loads are important and is restricted to anchoring schemes which employ a head at the end of the tie rod. The invention provides a means for protecting the head of the tie rod from all loads except tensile loads. This, in effect, means that bending stresses at the head, which are the most frequent cause of head failures, are virtually eliminated. By adding the shank 26 to the anchoring terminal, the tensile force on the rod is the only force acting on the head 27. When the rod is vibrated by wind or other lateral forces through the angle $\theta$, so that the direction of the force T is alternately T1 and T2, reactive forces P1 and P2 are alternately imposed by the terminal on the tie rod head. These produce destructive bending fatigue stresses in the head. By extending the terminal, the reactive forces P1 and P2 no longer bear on the head but become couples located approximately as shown in FIG. 5, and the only load borne by the head is the force T. Bending stresses in the rod are now a maximum at the point where the rod 14 emerges from the fitting. These stresses are a function of the lateral loads on the stay, the length L from the pin center to the end of the elongated fitting, and the fitting of the clevis pin in the holes 24 and 25. By properly selecting the length L, bending stresses can invariably be reduced to a negligible and acceptable level.

Anyone familiar with tensile-stress tie rods of high strength will immediately recognize that knurling the end of the rod and then swaging a soft malleable terminal on the roughened end is a popular type of terminal, but the very fact that the terminal is soft enough for swaging means that it is necessarily of a low strength material and is, therefore, large and heavy. The other most popular method of anchoring tie rods is to swage the center portion of the rod to a small diameter having large soft ends which may then be threaded, welded, and secured in any desired fashion. This method is, of course, very expensive. In accordance with the present invention, a head is formed on both ends of the tensile tie rod. Fittings are slipped over the rod before forming the heads 27. This is a simple matter and the rod may be made of very high strength material. The head 27 is similar to the common screw or nail heads and formed by the well-kwown process of "cold heading", but this invention applies to high strength materials which are not normally considered to be "cold headable".

The present invention is of greatest importance in "spring" temper tie rods made of cold-worked spring steels of over 200,000 psi ultimate tensile strength. Normally, one would expect that the size of the head which could be formed in steel of this strength would be limited by the elongation permissible in the material before failure and that the head would be too small to be of practical value, but the fact of the matter is that this invention deals with steels which have been severely cold-drawn and the outer fibres of such rods contain trapped tensile stresses. Because the heading process produces compressive stresses, the material undergoes complete stress reversal permitting a larger head to be formed than had ever been supposed would be possible from the elongation properties of the material. The diagram shown in FIG. 6 shows the cold-worked tie rod of high strength and the stresses trapped in the rod as the result of cold-drawing through a die.

Figure 7:
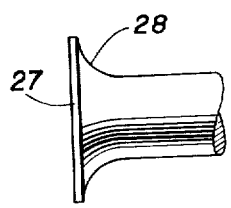
FIG. 7 is a side view of the end of a rod after the heading operation.

FIG. 7 illustrates the approximate shape of a typical head which possesses area ample for efficient seating. This head is almost twice the diameter of the rod and would be impossible to form in high strength material were it not for the trapped stress shown in FIG. 6. In fact, attempts to form such a head in a steel which has achieved an ultimate tensile strength of over 200,000 psi by heat treatment rather than cold-work, has been found to be futile. The heads fail in shear before they are formed.

Almost all terminals on the market today are designed so that the cable or rod to which they are attached will fail in tension before failure of the terminal or swaging occurs. They are not, however, designed to resist bending moments which may be imposed by vibration of the rod or cable combined with friction of the pin securing the cable. The present invention improves present terminals so that the strength would exceed that of the cable or rod in applications where vibration of the rod or cable is a factor. In the past, the configuration of the terminal has been such that the seemingly harmless stress brought about by swaging is concentrated and amplified at a discontinuity caused where the drilled hole for receiving the cable ends. For this reason, a typical prior art fitting would fail after only 20,000 to 40,000 oscillations, if the force is equal to 50 percent of the ultimate tensile strength of the cable. However, with the present invention and the cable hole drilled entirely through the shank of the fitting, a stress concentration is eliminated. Furthermore, the rod or cable extends closer to the anchor pin and fits snugly at the diameter of the bore 21 which provides reinforcement. These combined improvements provide a terminal so strong that the rod or cable rather than the fitting will generally fail under vibratory loads.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A terminal assembly for a rod or the like functioning as a tension member and subject to vibration-inducing air flow, comprising:
   a. a rod of cold drawn metal of over 200,000 psi tensile strength,
   b. a fitting formed in one piece of solid metal having an eye with a transverse bore adapted to receive a fastening pin, the fitting also having an elongated shank extending away from the eye and having a bore extending longitudinally of the shank from its free end to adjacent bore in the eye, the bore having a diameter substantially the same as the rod to fit snugly around the rod and having a length several times greater than its diameter, the rod extending entirely through the bore and being formed with a head, the head having an annular concave surface which engages a corresponding annular convex surface formed on the fitting around the exit of the bore adjacent said eye, and the lateral extent of the concave surface of said head beyond the periphery of the rod is approximately the radius of the rod.

2. A terminal assembly as recited in claim 1, wherein the fitting is a generally U-shaped clevis having two legs with aligned pin bores extending through the legs, the rod bore through the clevis and the shank having its axis at a right angle to the axis of the pin bores, the rod bore having the same diameter as the rod to embrace it along the entire length of the bore.

3. A terminal assembly as recited in claim 1, wherein the shank is formed of a malleable metal so that it can be swaged around the rod.

* * * * *